United States Patent
Poulain

(10) Patent No.: US 9,237,378 B2
(45) Date of Patent: Jan. 12, 2016

(54) METHOD OF SYNCHRONISING A PLURALITY OF FORMATTING MODULES

(75) Inventor: Ludovic Poulain, Rennes (FR)

(73) Assignee: ENENSYS TECHNOLOGIES, Rennes (FR)

( * ) Notice: Subject to any disclaimer, the term of this patent is extended or adjusted under 35 U.S.C. 154(b) by 432 days.

(21) Appl. No.: 12/921,234

(22) PCT Filed: Feb. 26, 2009

(86) PCT No.: PCT/EP2009/052255
§ 371 (c)(1),
(2), (4) Date: Nov. 5, 2010

(87) PCT Pub. No.: WO2009/112371
PCT Pub. Date: Sep. 17, 2009

(65) Prior Publication Data
US 2011/0051871 A1 Mar. 3, 2011

(30) Foreign Application Priority Data
Mar. 7, 2008 (FR) ...................................... 08 01279

(51) Int. Cl.
| | | |
|---|---|---|
| *H04L 7/00* | (2006.01) | |
| *H04N 21/438* | (2011.01) | |
| *H04H 20/18* | (2008.01) | |
| *H04H 20/26* | (2008.01) | |

(Continued)

(52) U.S. Cl.
CPC ........... *H04N 21/4382* (2013.01); *H04H 20/18* (2013.01); *H04H 20/26* (2013.01); *H04L 7/00* (2013.01); *H04N 21/21* (2013.01); *H04N 21/23* (2013.01); *H04N 21/2383* (2013.01); *G06F 11/2038* (2013.01); *G06F 11/2097* (2013.01); *H04H 20/12* (2013.01); *H04H 20/67* (2013.01)

(58) Field of Classification Search
CPC .......................................................... H04L 7/00
USPC ........................................ 375/354, 356, 358
See application file for complete search history.

(56) References Cited

U.S. PATENT DOCUMENTS

| | | | | |
|---|---|---|---|---|
| 5,881,113 | A * | 3/1999 | Lee ................................. | 375/354 |
| 6,034,732 | A * | 3/2000 | Hirota et al. ................... | 348/441 |
| 6,683,848 | B1 * | 1/2004 | Parrish ........................... | 370/218 |

(Continued)

OTHER PUBLICATIONS

Preliminary Examination Report on Patentability for PCT/EP2009/052255, dated Feb. 26, 2009, in English.

(Continued)

*Primary Examiner* — Kevin M Burd
(74) *Attorney, Agent, or Firm* — Nixon & Vanderhye, P.C.

(57) ABSTRACT

In the field of the broadcasting of digital services intended for terminals retrieving these services, the concern is with the problem of synchronization in the context of a network transmitting on a single modulation frequency and the reliability of the broadcasting channel by redundancy of equipment.

The present invention proposes a broadcasting system having a duplicated formatting module. This system enables a modulator to switch between the two streams generated by the two formatting modules without becoming desynchronized. These formatting modules are synchronized with each other in order to generate synchronized streams. Thus, when a modulator is caused to switch from a first stream generated by one of the formatting modules onto a second stream generated by a second formatting module, this switching can be effected without requiring a resynchronization step. This prevents an incident occurring on the generation of the stream routinely causing an interruption of service due to the resynchronization of the modulator.

9 Claims, 2 Drawing Sheets

(51) Int. Cl.
   *H04N 21/21* (2011.01)
   *H04N 21/23* (2011.01)
   *H04N 21/2383* (2011.01)
   *G06F 11/20* (2006.01)
   *H04H 20/12* (2008.01)
   *H04H 20/67* (2008.01)

(56) References Cited

U.S. PATENT DOCUMENTS

2006/0088023 A1* 4/2006 Muller .................. 370/350
2007/0091857 A1* 4/2007 Elstermann ............ 370/338

OTHER PUBLICATIONS

International Search Report for PCT/EP2009/052255, mailed Apr. 15, 2009.

Foreign-language Written Opinion of the International Searching Authority for PCT/EP2009/052255, mailed Apr. 15, 2009.

Gronewald, U., "Das UberallFernssehen—Fernsehen uberall? Zwischenbilanz einer Weltpremiere", Symposium Der Deutschen TV-Plattform, [Online] (May 15, 2003), pp. 1-8.

Seo, C. et al., "Exploring the Role of Software Architecture in Dynamic and Fault Tolerant Pervasive Systems", Software Engineering for Pervasive Computing Applications, Systems and Enviroments, (May 1, 2007), pp. 1-7.

Martins, E. et al., "An Approach to the Synchronization of Backup Masters in Dynamic Master-Slave Systems" [Online], (Sep. 9, 2005), pp. 1-4.

Anonymous, "Failover", Wikipedia [Online], (Jan. 5, 2008), 1 page.

* cited by examiner

METHOD OF SYNCHRONISING A PLURALITY OF FORMATTING MODULES

This application is the U.S. national phase of International Application No. PCT/EP2009/052255 filed 26 Feb. 2009, which designated the U.S. and claims priority to Europe Application No. 08/01279 filed 7 Mar. 2008, the entire contents of each of which are hereby incorporated by reference.

The present invention concerns the field of the broadcasting of digital services intended for terminals retrieving these services. More particularly, it is concerned with the problem of synchronisation in the context of a network transmitting on a single modulation frequency and the reliability of the broadcasting channel by redundancy of equipment.

An example of a typical broadcasting channel for digital services is illustrated in FIG. 1. The services are encoded individually by a set of encoders 1.1. These encoders have media making up the service. These media may be composed of video sequences, audio sequences, text or interactive applications. At the output from the encoder, there is a stream of digital data composed of a set of packets issuing from elementary video, audio or other streams making up the service.

These services are then multiplexed by the multiplexer 1.2. This operation consists of constructing a stream mixing the data packets of the various services that are to be broadcast. The result is a stream of digital data comprising the data from the various services. Several data formats may be used, in particular the MPEG-2 or MPEG-2 TS (standing for Moving Picture Experts Group, described in the standard document ISO/CEI 13818-1) transport stream format, and the IP format.

In the context of a radio transmission, the stream is intended to be transmitted in the form of a radio signal by one or more modulators 1.4. Management of the radio resource by these modulators and in particular management of the interference that may occur between the signals transmitted by these various modulators may be regulated in various ways. In particular, one broadcasting mode provides for the data stream transmitted by the various modulators to be always transmitted on the same frequency and at the same moment. This broadcasting mode is called an SFN (Single Frequency Network) mode.

In such an SFN network, it is necessary to finely synchronise the signals broadcast by the various modulators in order to avoid the appearance of phenomena of interference in the boundary regions at the limits of the reception areas of several modulators. In these areas, the signal received by a terminal is composed of the signals transmitted by at least two modulators.

This synchronisation is obtained by a module for formatting the stream 1.3, the function of which is to format the stream that is to be broadcast with a view to a radio transmission synchronised by a plurality of modulators. This formatting may for example consist of the insertion of synchronisation marks in the stream. These marks are then used by the modulator to synchronise the transmission of the signal. This device advantageously uses a common clock received both by the formatting module 1.3 and by the modulators 1.4. This clock may for example be broadcast by the GPS (Global Positioning System) satellite system.

The stream is broadcast between the formatting module 1.3 and the modulators 1.4 by a distribution network that can use various types of link such as satellite, radio or cable links. These types of link do not offer total transmission reliability. Moreover, it also happens that the reception of the clocks necessary for the formatting of the stream by the formatting module suffers incidents. Confronted by these difficulties, the modulators may loose their synchronisation with the stream received. These losses of synchronisation require resynchronisation that may take up to a minute and may cause a service interruption detrimental to the quality of service perceived by the user.

Attempts to make the broadcasting channel more reliable have consisted of introducing a second formatting module making it possible, using a single received stream, to generate two streams intended for the modulator or modulators. Unfortunately, when the generation of a stream by one of the formatting modules experiences a problem, the switching to the backup stream generated by the second formatting module generally causes a step of synchronisation of the module to this second stream.

The present invention aims to solve this problem by a broadcasting system having a duplicated formatting module. This system enables a modulator to switch between the two streams generated by the two formatting modules without desynchronising. These formatting modules are synchronised with each other in order to generate synchronised streams. Thus, when a modulator is caused to switch from a first stream generated by one of the formatting modules to a second stream generated by a second formatting module, this switching can take place without requiring a resynchronisation step. An incident occurring on the generation of the stream is thus prevented from routinely causing a service interruption due to the resynchronisation of the modulator.

The invention concerns a method of synchronising a plurality of formatting modules with a view to a synchronised broadcasting of a stream of digital services, each formatting module receiving at least one stream to be formatted as an input, and at least one reference clock signal, and generating at least one output stream corresponding to the input stream formatted according to the reference clock signal received.

The said method comprises a step of electing a formatting module from the plurality as having the status of master, the other modules having the status of slave; a step of periodic sending of a time label used by the master module in the operation of formatting the stream to the salve modules and a step of temporal slaving of the operation of formatting the stream by the slave modules according to the time label received from the master module.

According to a particular embodiment of the invention, the method also comprises a step of comparing a continuity counter for the time label used by the slave module with the continuity counter for the corresponding label received from the master module, the slave module adopting for its time label the continuity counter for the master label in the event of divergence.

According to a particular embodiment of the invention, the method also comprises a step consisting of taking the status of the slave for the master module as soon as the reception of the input stream or a reference clock signal is no longer correct.

According to a particular embodiment of the invention, the method also comprises a step consisting of taking the status of master for a slave module, having all its input signals correct, when it receives a message indicating that the other modules in the plurality do not all have their correct input signals.

According to a particular embodiment of the invention, the method also comprises, for a slave or master module having all its input signals correct, when it receives a message from at least one other module also having its input signals correct, an election step for determining whether it takes the status of master or slave so that one of the modules having its input signals correct takes the status of master, the others taking the status of slave.

According to a particular embodiment of the invention, the method also comprises a step consisting, for each formatting module, of periodically sending its status to the other modules.

According to a particular embodiment of the invention, the periodic sending of status takes place in response to a status request on the part of the other modules.

The invention also concerns a device for formatting with a view to a synchronised broadcasting of digital service streams, receiving at least one stream to be formatted as an input, and at least one reference clock signal, and generating at least one output stream corresponding to the input stream formatted according to the reference clock signal received. The said device comprises means of communicating with at least one other formatting device, itself and these other formatting devices forming a plurality of formatting devices; means of electing a formatting device from the plurality having the status of master, the other modules having the status of slave; means of periodic sending of a time label used by the master module in the operation of formatting the stream to the slave modules and means of temporal slaving of the operation of formatting the stream by the slave modules according to the temporal label received from the master module.

The invention also concerns a system of broadcasting digital services comprising a plurality of formatting modules as previously described.

The features of the invention mentioned above, as well as others, will emerge more clearly from a reading of the following description of an example embodiment, the said description being given in relation to the accompanying drawings, among which;

The example embodiment is described in the context of a broadcasting of digital services according to the DVB (Digital Video Broadcasting) standard, in particular in the context of the DVB-H (Digital Video Broadcasting-Handheld) standard described in the document "ETSI EN 302 304, DVB-H—Transmission System for Handheld Terminals" and the DVB-T (Digital Video Broadcasting-Terrestrial) standard described in the document "ETSI EN 300 744 V1.5.1, Digital Video Broadcasting (DVB); Framing structure, channel coding and modulation for digital terrestrial television". However, a person skilled in the art will understand that the present invention can apply in any digital service broadcasting system provided that this system requires the use of a module for formatting the stream with a view to synchronised broadcasting, in particular in any SFN broadcasting network.

Figure 1:
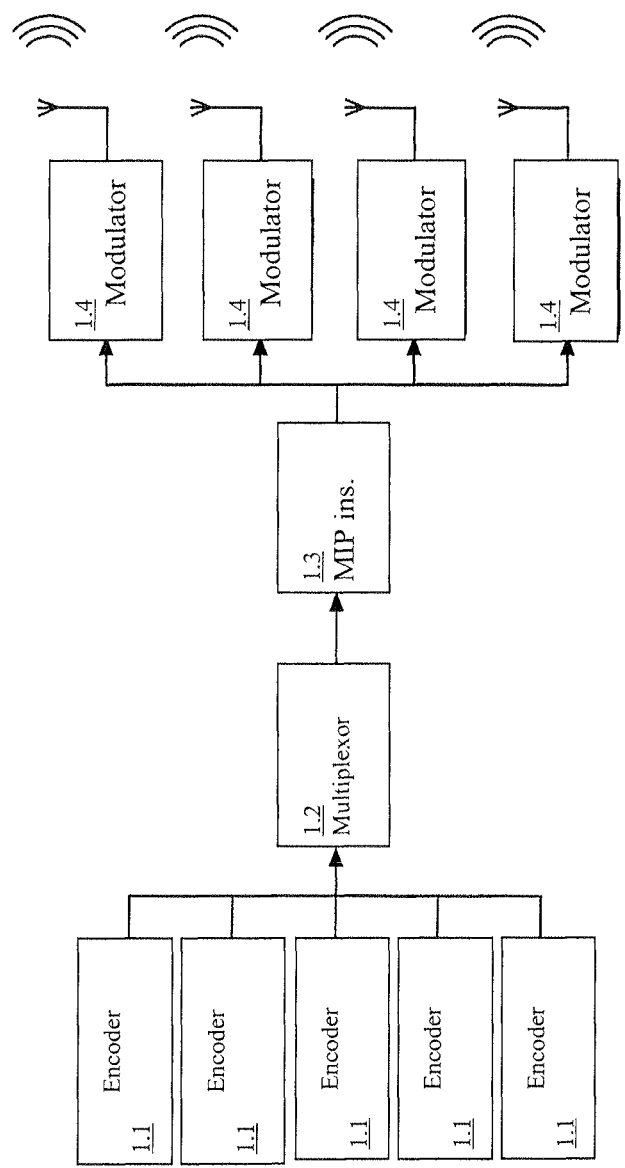
FIG. 1 illustrates an example of a digital distribution channel.
Figure 2:
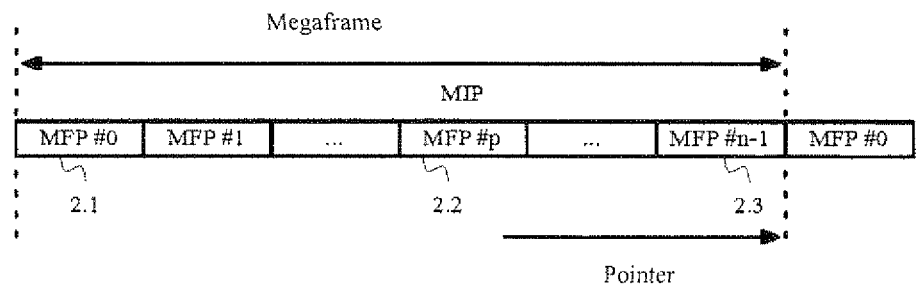
FIG. 2 illustrates an example of a structure of a stream formatted with a view to synchronised broadcasting.

The modulators are synchronised, in this context, according to the mechanism described in the document ETSI TS 101 191 "Digital Video Broadcasting (DVB); DVB megaframe for Single Frequency Network (SFN) synchronisation". This document describes how the formatting module, called here the SFN adapter, introduces packets called MIP packets in the stream. This stream is decomposed into megaframes. Each megaframe is composed of a number n of TS (Transport Stream) packets, this number n depending on the modulation adopted. It is illustrated in FIG. 2. In this figure, the TS packets in the stream are numbered according to their place in the megaframe from the first MFP packet #0, referenced 2.1, to the MFP packet #n−1, referenced 2.3, where "n" is the number of TS packets in the megaframe. Within the megaframe, an initialisation packet, referenced 2.2, is introduced, this packet is called the MIP packet (Megaframe Initialization Packet) and has a dedicated PID identifier. This MIP packet makes it possible to identify precisely the first packet of the following megaframe. It also has a timestamp indicating the difference between the last pip of a period clock, a reference second that precedes the start of the following megaframe and the actual start of this following megaframe. This timestamp is called the STS (Synchronisation Time Stamp). The reference clock is generally obtained by means of a GPS (Global Positioning System) receiver. The STS timestamp is expressed in steps of 100 ns.

The main function of the stream formatting module, or SFN adaptor, is therefore chopping the stream into megaframes and inserting the MIP packets therein, one per megaframe, enabling the modulators to be synchronised. In a dual manner, the modulator synchronises the sending of the signal transmitting this stream by fixing onto the MIP packets received. This makes it possible to precisely fix in time the sending of the data of the megaframes according to the reference clock received. When there is a loss of synchronisation that may be due to a problem of receiving the reference clocks or to transmission problems, it is necessary to resynchronise the modulator before being able to resume transmission. This resynchronisation may take time, up to one minute in real cases. This results in interruptions in service for the user. The formatting module therefore generates at least one output stream corresponding to at least one input stream formatted according to the reference clock signal received.

Figure 3:
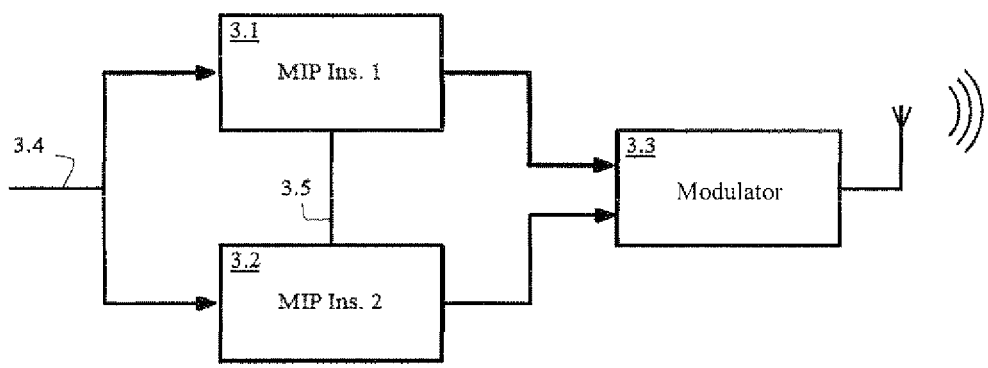
FIG. 3 illustrates the architecture of the stream-formatting modules according to an example embodiment of the invention.

A first means for improving the reliability of broadcasting consists of duplicating the stream formatting module. Such a solution is illustrated in FIG. 3. The data stream, to the MPEG-2 TS format, referenced 3.4, is duplicated in order to be accepted as an input of two formatting modules 3.1 and 3.2. Each of these modules formats the stream received as an input with a view to synchronised broadcasting. In this case, in the context of the example embodiment, this formatting consists of inserting MIP packets in the stream. The streams thus formatted are transported by a distribution network intended for the modulators 3.3, only one being shown in the figure. Advantageously, the distribution network may be different for each of the streams issuing from the formatting modules. This enables the two streams not to undergo the same transmission problems while being transported by the same network. The modulator is adapted to receive the two streams.

Alternatively, the selection of the input stream of the modulator can be entrusted to a dedicated module. This selection module accepts as an input the streams issuing from the formatting modules. It is responsible for selecting the correct input and effecting the switchings when one of the streams is no longer correct. It has an output to which it redirects the selected input. This output supplies a distribution network intended for several modulators.

In nominal mode, the modulator transmits a signal corresponding to one of the streams received. It is then synchronised on this stream. In the event of a problem in the reception by the modulator of the stream sent, it can switch onto the second input and send a signal issuing from the second stream. Under these circumstances, nothing guarantees that the two streams received by the modulator will be synchronised and that the time information sent within the MIP packets by the two formatting modules will correspond. Switching therefore generally gives rise to a phase of synchronisation of the modulator onto the second stream.

To solve this problem, a link 3.5 is added between the two formatting modules 3.1 and 3.2. This communication link will advantageously be a link the latency of which is deterministic. This link may for example consist of a serial link, an IP connection to Ethernet, a fibre, a coaxial link or other. This connection link enables messages to be exchanged by the two formatting modules. These exchanges of messages make it possible to synchronise the two modules in order to generate two synchronised streams.

The two formatting modules function according to a master/slave scheme. The synchronisation scheme between the sets of apparatus is designed so that each appliance can at any time determine its master or slave status. At any time, only one of the two appliances can be the master. The master imposes its synchronisation on the slave apparatus.

Each formatting module receives as an input a stream to be formatted. It also receives time information that enables it to manage its temporal stream formatting operations. This information consists of GPS clocks in the example embodiment. In addition, it can send or receive synchronisation messages via the link 3.5. The formatting of the stream consists of constructing, from the TS packets received, megaframes constituting the output stream. Each megaframe consists of a certain number of packets of the input stream and an MIP packet constructed and inserted in the megaframe. Optionally, the megaframe may be supplemented by stuffing data in order to regulate the transmission rate of the stream. Each MIP packet consists of a continuity counter and time information relating to the moment of transmission of the next megaframe. This time information is given in relation to the GPS clocks received. In nominal operating mode, in the context of the invention, for each of the formatting modules a module managing the construction of these MIP packets is initialised and slaved to the GPS clocks. Each apparatus is in a position to generate the output stream according to its inputs. The formatting module is then said to be synchronised. When the reception of the input stream or the reference clocks undergoes an interruption, the apparatus is no longer in a state to correctly generate the output stream. It is then said to be desynchronised. In this desynchronised state, the output of the apparatus is interrupted. The return of a correct reception of the inputs initiates a resynchronisation phase necessary for the module generating the MIP packets to be once again correctly slaved to the clocks and to be in a position to generate the correct MIP packets within megaframes.

When the system is started up, an auto-negotiation phase defines the master apparatus and the slave apparatus. The two sets of apparatus are initially in a slave state. Each apparatus sends to the other a status request message. When a status request is received, the apparatus returns its status to the author of the request. The status comprises the state of receiving the reference clock signals and the state of receiving the input stream. It also sends a unique identifier. This identifier is unique in that it is necessarily different for each apparatus. This identifier may for example consist of the MAC address of the apparatus or at least part of this address. It may also be a serial number. Any identifier the value of which is particular to the apparatus can be used here.

If an apparatus has one of its input signals, stream or clock, which is not correctly received, it automatically takes the status of slave.

If an apparatus has all its signals correct and the status message received from the other apparatus indicates to it that the other apparatus does not have all its signals correct, it takes the status of master.

If an apparatus has all its signals correct and the status message received from the other apparatus indicates to it that the other apparatus also has all its signals correct, it performs a step of electing the master apparatus. This election step consists of comparing its identifier and the identifier of the other apparatus that it received in the message. According to this comparison test it takes the status of slave or master. This is an example. The converse also applies: if its identifier is superior to the identifier of the other apparatus it becomes master. The important thing here is that the two sets of apparatus arrive at the same choice as to which becomes master and which remains slave.

The master formatting module formats the input stream as if it were alone. In addition, it regularly sends, for example for each megaframe, a synchronisation message to the slave formatting module. This message contains the time label of the current megaframe as well as the continuity counter for the MIP packet inserted in this megaframe. The slave formatting module checks that the value of the time label that it calculates for the same megaframe is identical to that received from the master. A slight offset is acceptable. In the example embodiment, the offset accepted is a microsecond. If the difference between the two time labels is greater than the acceptable offset, a time slaving phase is undertaken by the slave formatting module. It will make the next megaframe that it generates commence at an instant corresponding to the value of the time label received plus the theoretical duration of a megaframe. In this way, the slave module resets itself as soon as a drift is detected in order to remain slaved in time to the master module. The two modules are therefore synchronised with each other.

The slave module also checks the continuity counter for the MIP packet received from the master and compares it with the one that it is generating. In the case of a divergence, it takes the value of the master.

It is indeed necessary to establish the difference between the various synchronisation mechanisms used in the system. The first synchronisation mechanism is the conventional synchronisation mechanism of the formatting module that consists of a slaving to the reference clock signals received. This mechanism is used when the apparatus is started up and after a loss of reference clock signals as soon as these become correct again. A second synchronisation mechanism is the mechanism used by the modulator in order to synchronise itself to the stream received. It consists of slaving the sending of the signal to the time information contained in the stream, in this case in the MIP packets. The third synchronisation mechanism is the one supplied by the invention between the master formatting module and the slave. It consists, for the slave module, already synchronised on the reference clocks according to the first synchronisation mechanism, when it notes an offset between the time information that it is calculating and that received from the master, of locking onto the latter. The repetition period of the megaframe generator being deterministic, the slave module resets itself and then checks at the following megaframe that it has regained synchronisation with the master. If such is not the case, it recommences until it is synchronised with it.

As soon as the master formatting module loses one of these input signals, stream or reference clock, it goes into slave mode and sends a message indicating this to the other module. When such a message is received, the other formatting module that is in the slave state immediately takes the status of master provided that these input signals are correct.

Where the two formatting modules are in a state where their input signals are incorrect, neither of the two is in a position to take the status of master and to send a correct stream as an output. This rare condition of errors on the two modules leads to a service interruption.

In the example embodiment, the method of synchronisation between the two formatting modules involves the use of four types of synchronisation message.

A first type consists of a status request. This status request is sent periodically, for example every 5 megaframes. If an apparatus does not receive a reply to its status request at the end of a given time, for example the time taken to generate 15 megaframes, it takes the status of master provided that its inputs are correct.

A second type consists of status messages. These messages serve to notify the other module of the status, master or slave, in which it is situated.

Advantageously, the status also comprises the state of the inputs of the formatting module, as well as the unique identifier enabling the step of electing the master.

A third type of message consists of the synchronisation message, sent by the master and received by the slave. It is sent for example every megaframe and contains the continuity counter of the MIP packet and the corresponding time label. This type of message is used to effect the actual synchronisation between the two formatting modules.

A last type of message is the signal loss message in order to indicate to the other module that some of the input signals have just been lost and that consequently the slave status is being adopted.

It is possible to modify these messages without departing from the scope of the invention. In particular, in an alternative embodiment, the status messages are systematically sent periodically rather than in response to a status request message. This last type of message then becomes unnecessary.

The synchronisation method described here can obviously extend to the synchronisation of three or more formatting modules. The same election method guaranteeing that only one of the modules is master at a given moment, the others being slaves and synchronising on the master. This method is not limited to the DVB context but can apply as soon as a formatting module is duplicated with a view to a synchronised broadcasting of streams. This formatting being done using a reference clock signal received and involving the insertion of synchronisation time labels in the stream. The invention then functions by transmission of these time labels from the master to the slave and is not linked to the mechanism for synchronisation by MIP packet proper, which is only one example of this.

When the two modules are synchronised with each other, they generate streams themselves synchronised in that the megaframes generated by the two modules contain the same data, start at the same moment and contain MIP synchronisation packets carrying the same continuity counter and the same time label, the concept of same moment and same time label being to within an acceptable offset. A modulator can therefore switch between the two streams without becoming desynchronised. However, the two streams are not necessarily perfectly identical. In particular, management of the transmission rate gives rise to the introduction of stuffing packets in the stream. This management of transmission rate is not completely deterministic and it may happen that a data packet and a stuffing packet are inserted reversed in the two streams. A switching occurring between the data packet and the reversed stuffing packet would therefore give rise to either the non-reception of a data packet or its double reception. It is therefore possible to lose a data packet and therefore very occasionally to obtain an interruption of service. However, the latter would be of short duration, around one picture or at a maximum a group of pictures (GOP) encoded in a linked fashion. In all cases, the modulator will not lose its synchronisation and will not be obliged to begin a synchronisation step. In general, no interruption of service will be caused by the switching and, in the rare cases where it occurs, it would be of short duration.

The invention claimed is:

1. Method of synchronising a plurality of formatting modules with a view to a synchronised broadcasting of streams of digital services, each formatting module being associated to a state indicative of a master or slave status, each formatting module receiving at least one stream to be formatted as an input, and at least one reference clock signal, and generating at least one output stream corresponding to the input stream formatted into megaframes according to the reference clock signal received, and by inserting a time label in packets and a continuity counter in packets, the output streams being transferred to one or more modulators, the said method comprises:

electing a formatting module from the plurality as having the status of master, the other modules having the status of slave;

for the formatting module having a master status, periodic sending to the slave modules of the time label and the continuity counter of the packet inserted in a megaframe, the time label being used by the master formatting module in the operation of formatting the stream, the time label being sent each time a mega frame is transmitted and is the time label of the megaframe;

for a formatting module having a slave status, temporal slaving of the operation of formatting the stream by the slave modules according to the time label received from the master formatting module, the formatting of the stream by the slave being performed transferring the following megaframe at an instant corresponding to the time label and plus a megaframe duration and inserting the continuity counter received from the master formatting module in the megaframe.

2. Synchronisation method according to one of claim 1, characterised in that the method also comprises a step consisting of taking the slave status for the master module as soon as the input stream is received or a reference clock signal is no longer correct.

3. Synchronisation method according to claim 2, characterised in that the method also comprises a step consisting of taking the master status for a slave module, having all its input signals correct, when it receives a message indicating that the other modules in the plurality do not have all their input signals correct.

4. Synchronisation method according to claim 1, characterised in that the method also comprises, for a slave or master module having all its input signals correct, when it receives a message from at least one other module also having its input signals correct, an election step for determining whether it takes the state of master or slave so that one of the modules having its input signals correct takes the status of master, the others taking the status of slave.

5. Synchronisation method according to claim 1, characterised in that it also comprises a step consisting, for each formatting module, of periodically sending its status to the other modules.

6. Synchronisation method according to claim 5, characterised in that the periodic sending of status takes place in response to a status request on the part of the other modules.

7. Synchronisation method according to claim 1, characterised in that the method also comprises a step of comparing a-continuity counter for the time label used by the slave module with the continuity counter for the corresponding label received from the master module, the slave module adopting for its time label the continuity counter for the label of the master in the event of a divergence.

8. Formatting device with a view to a synchronised broadcasting of digital service streams, the formatting device being associate to a state indicative of a master or slave status, receiving at least one stream to be formatted as an input, and at least one reference clock signal, and generating at least one output stream corresponding to the input stream formatted into megaframes according to the reference clock signal received, and by inserting a time label in packets and a continuity counter in packets, the output streams being transferred to one or more modulators, the said device comprises:

- means of communicating with at least one other formatting device, itself and these other formatting devices forming a plurality of formatting devices;
- means of electing a formatting device from the plurality as having the status of master, the other devices having the status of slave;
- means of periodic sending, when in a master status, to the slave devices of the time label and a continuity counter of a packet inserted in a megaframe, the time label being used by the master device in the operation of formatting the stream, the time label being sent each time a mega frame is transmitted and is the time label of the megaframe;
- means of temporal slaving, when in a slave status, of the operation of formatting the stream by the slave devices according to the time label received from the master device, the formatting of the stream by the slave being performed by transferring the following megaframe at an instant corresponding to the time label and plus a megaframe duration and inserting the continuity counter received from the master module device in the megaframe.

9. System for broadcasting digital services, comprising a plurality of formatting modules according to claim 8.

* * * * *